United States Patent [19]

Schmidt et al.

[11] Patent Number: 5,894,450
[45] Date of Patent: Apr. 13, 1999

[54] MOBILE UNDERWATER ARRAYS

[75] Inventors: Henrik Schmidt, Norfolk; James G. Bellingham, Norwood; James W. Bales, Brookline, all of Mass.

[73] Assignee: Massachusetts Institute of Technology, Cambridge, Mass.

[21] Appl. No.: 08/843,355

[22] Filed: Apr. 15, 1997

[51] Int. Cl.$^6$ .................................................. H04B 11/00
[52] U.S. Cl. ........................... 367/134; 367/131; 367/133
[58] Field of Search ..................................... 367/131, 133, 367/134, 117, 910

[56] References Cited

U.S. PATENT DOCUMENTS

| | | | |
|---|---|---|---|
| 5,331,602 | 7/1994 | McLaren | 367/134 |
| 5,579,285 | 11/1996 | Hubert | 367/133 |
| 5,687,137 | 11/1997 | Schmidt et al. | 367/131 |

OTHER PUBLICATIONS

P.F. Worcester et al "A Review of Ocean Acoustic Tomography: 1987–1990", Rev. of Geophysics Supplement, pp. 557–570, Apr. 1991.

W. H. Munk et al, "Ocean Acoustic Tomography: A Scheme for Large Scale Monitoring", Deep Sea Research, vol. 26A, pp. 123–161, 1979.

T. B. Curtin, et al., "Autonomous Oceangraphic Sampling Networks", Oceanography, vol. 6, No. 3, pp. 86–93, 1993.

J. Bellingham et al, "A Small Long Range Autonomous Vehicle for Deep Ocean Exploration", Proc. 2nd 1992 Int. Offshore and Polar Engineering Conf., San Francisco, CA, Jun. 14–19, 1992.

J. Bellingham et al, "A Second Generation Survey AUV", Conf. Proc. AUV 94, IEEE, Jul. 19–20, 1994, Cambridge, MA., pp. 148–155.

R.C. Spindel, "Ocean Acoustic Tomography: A Review", Dept. Of Ocean Eng., Woods Hole Oceangraphic Institute, Woods Hole, Massachusetts, pp. 7–13.

J.G.W. Kelley et al, "Coupled Lake Erie Air–Sea, Storm Resolving Forecasts and Predictions, the Viento Project", Proc. ASCE Conf, 1994, pp. 202–215.

H.L. Dantzler Jr., An Expert System for Describing and Predicting the Coastal Ocean Johns Hopkins APL Tech. Digest, vol. 14, No. 2, 1993, pp. 181–192.

H. Schmidt et al, Physics–Imposed Resolution and Robustness Issues in Seismo–Acoustic Parameter Inversion, Full Field Inversion Methods in Ocean and Seismo–Acoustics, Ed. O. Diaschok et al, Kluwer Acad. Publ., 1995, pp. 85–90.

A.B. Baggeroer et al, "Parameter Estimation Theory Bounds and the Accuracy of Full Inversions", Full Field Inversion Methods in Ocean And Seismo–Acoustics, Ed. O. Diaschok et al, Kluwer Acad. Publ., 1995 pp. 79–84.

(List continued on next page.)

*Primary Examiner*—Ian J. Lobo
*Attorney, Agent, or Firm*—Wolf, Greenfield & Sacks, P.C.

[57] ABSTRACT

An oceanographic sampling system includes two or more underwater vehicles disposed in an array and an array controller for controlling the array of underwater vehicles as data is acquired. Each underwater vehicle includes a propulsion system for moving the underwater vehicle independently of the other underwater vehicles, a sensor for sensing an ocean parameter and providing sensor data representative of the ocean parameter as the underwater vehicle moves, a navigation subsystem for determining position data representative of the position of the underwater vehicle as the sensor data is acquired and a synchronizing subsystem for time synchronizing the sensor data and the position data acquired by the underwater vehicle with sensor data and position data acquired by other underwater vehicles. The array of underwater vehicles may function as a large aperture phased array, and phased array analysis techniques may be applied to the time-synchronized sensor data and position data.

46 Claims, 5 Drawing Sheets

OTHER PUBLICATIONS

A.B. Baggeroer et al, "Cramer–Rao Bounds for Matched Field Tomography and Ocean Acoustic Tomography", MIT, ATOC Occasional Notes, No. 27, Mar. 1995, pp. 1–5.

W. Munk, "How to Resolve Modes with Sparse Arrays", ATOC Occasional Notes, No. 29, Mar. 1995 pp. 1–2.

K. Curtis et al, "ATOC Ambient Noise Measurements", ATOC Occasional Notes, No. 28, Mar. 1995, pp. 1–4.

H. Singh et al, "An Integrated Approach to Multiple AUV Communications, Navigation and Docking", Oceans '96 MTS/IEEE Conference Proceedings.

J.L. Backes et al, "Long–Baseline Deep Ocean Acoustic Tracking and Telemetry System", Proceedings of Oceans '81, Boston, MA, pp. 1–8, 1981.

M. Deffenbaugh et al, "The Relationship Between Spherical and Hyperbolic Positioning", Proceedings of Oceans '96, Ft. Lauderdale, FL. p. 590, 1996.

M. Triantafyllou et al, "Distributed Control of Multiple AUV Forming Effective Chains", Proc. of 7th Int'l. Symp. on Unmanned, Untethered Submersible Tech.,U. of New Hampshire, Sep. 1991, pp. 499–518.

J.W. Bales et al, "High Bandwidth, Low–Power, Short–Range Opt. Comm. Underwater", Proc. of 9th Int'l. Symp. on Unmanned, Untethered Submersible Tech., Durham, NH, Sep. 1995, pp 406–415.

MOBILE UNDERWATER ARRAYS

GOVERNMENT RIGHTS

This invention was made with government support under grant number N00014-94-1-1001 awarded by the Department of the Navy. The government has certain rights in the invention.

FIELD OF THE INVENTION

This invention relates to oceanographic measurement technology and, more particularly, to oceanographic sampling methods and apparatus utilizing arrays of mobile underwater vehicles.

BACKGROUND OF THE INVENTION

Oceanographic measurements play an important role in all aspects of ocean science and engineering. Typical applications in applied marine science and engineering include mapping of pollutant transport, environmental monitoring, search for pollution sources, national security, target localization, search and rescue, marine geophysics, resource exploration and resource production. In basic marine science, oceanographic measurements are a key component, together with modeling, of the development of the fundamental understanding which subsequently provides the basis for engineering, management, and policy solutions.

A common problem for all these applications of marine measurements is the fact that they have become extremely platform limited. The performance/cost ratio has grown exponentially for the computer technology used for modeling and analysis, but has been diminishing or, at best, remained unchanged in terms of the platforms. Most oceanographic measurements are still performed from ships.

The development of inexpensive autonomous underwater vehicle technology has provided a breakthrough in terms of performance/cost ratio, with the potential for revolutionizing the area of experimental oceanography in deep as well as shallow water. The concept of autonomous oceanographic sampling networks (AOSN) provides a particularly powerful technology. Autonomous oceanographic sampling networks are described, for example, by T. B. Curtin et al, in "Autonomous Oceanographic Sampling Networks ", *Oceanography*, Vol. 6, No. 3, 1993, pages 86–93. However, the AOSN technology has its inherent limitations because of its particular functionality.

A fundamental problem facing oceanographic measurement techniques is a tradeoff between coverage and resolution. A measurement system may cover a large area, but only be able to produce results over a very coarse grid in space and time. This is the case for ship-based collection of water samples. Other measurement techniques are highly accurate and capable of measuring small spatial and temporal variations, but cover only a very small volume. In general, the common methods applied in oceanography provide a compromise between the two extremes. While a wide variety of oceanographic measurement techniques exist, none is capable of simultaneously providing wide area coverage of the entire water column and high resolution.

One widely-used oceanographic measurement technique is acoustic tomography, which is a spin-off of the acoustic methods developed for anti-submarine warfare. Acoustic tomography uses the fact that sound speed is strongly dependent on temperature, salinity and pressure, properties which can therefore be inferred in an ocean volume by analysis of acoustic transmissions within the source-receiver network deployed in the volume. Typically, an acoustic tomography network includes five or six vertical receiver arrays spanning the water column. Each array has an acoustic source transmitting a coded sequence to the other arrays. The analysis is performed by simulating the received signals using a propagation model, the input parameters of which are varied to reproduce the measured data. Acoustic tomography provides coverage in the vertical slices between the sources and receivers, but virtually no information about regions between the slices. The spatial resolution of acoustic tomography is very limited, typically on the order of 100 meters in the horizontal direction and 10 meters in depth. Furthermore, the vertical arrays have fixed positions. The main advantage is the coverage in terms of frequent snapshots, allowing for tracking of oceanographic dynamics. Acoustic tomography is described, for example, by P. F. Worcester, et al. in "A Review of Ocean Acoustic Tomography: 1987–1990", *Reviews of Geophysics, Supplement*, pages 557–570, April 1991 and by W. H. Munk, et al. in "Ocean Acoustic Tomography: A Scheme for Large Scale Monitoring", *Deep Sea Research*, Vol. 26A, pages 123–161, 1979.

One implementation of the autonomous ocean sampling network employs moored buoys which function as network nodes for a long-term multiple underwater vehicle presence in the ocean. The objective is to provide an economically feasible capability for a repeated synoptic characterization of large scale oceanographic phenomenon. The key to such a system is a small, low-cost autonomous underwater vehicle which can be operated reliably over extended, unattended deployments at sea. The vehicles traverse the network recording temperature, salinity, velocity and other data, relaying key observations to the network nodes in real time and transferring more complete data sets after docking at a node. Each network node consists of a base buoy or mooring containing an acoustic beacon, an acoustic modem, point sensors, an energy source and one or more autonomous underwater vehicle (AUV) docks. The motivation for multiple vehicle surveys is that the quality and utility of the data obtained improves much faster than the number of vehicles for large scale dynamic ocean phenomenon.

Arrays of hydrophones are widely used. Multiple hydrophones may be spaced along a cable towed behind a ship to form a towed array. The hydrophones may be used in seismic exploration to sense seismo-acoustic energy reflected from structures below the ocean floor or may be used to localize an acoustic source, such as a submarine. Towed arrays have fixed configurations and may be difficult to maneuver. Fixed arrays of hydrophones may be used for similar applications, but lack flexibility and maneuverability.

Existing oceanographic measurement techniques have one or more drawbacks, including low resolution, lack of mobility, lack of flexibility, small acoustic apertures and an inability to adapt to changing conditions it is desirable to provide oceanographic measurement apparatus and methods which overcome one or more of these drawbacks. In particular, it is desirable to provide oceanographic measurement apparatus and methods which permit simultaneous measurement of target characteristics from different directions, which have mobility and flexibility and which permit large acoustic apertures to be implemented at low frequencies.

According to a first aspect of the invention, an oceanographic sampling system comprises a plurality of underwater vehicles disposed in an array having an array configuration and array control means for controlling the array of underwater vehicles as data is acquired. Each underwater vehicle includes a propulsion system for moving the underwater vehicle independently of the other underwater vehicles, a sensor for sensing an ocean parameter and providing sensor data representative of the ocean parameter as the underwater vehicle moves, a navigation subsystem for determining position data representative of the position of the underwater vehicle as the sensor data is acquired and a synchronizing subsystem for time synchronizing the sensor data and the position data acquired by the underwater vehicle with sensor data and position data acquired by the other underwater vehicles. The underwater vehicles function as a phased array, and phased array analysis techniques may be applied to the time-synchronized sensor data and position data.

The array control means may control the array configuration, array movement and underwater vehicle function, alone or in combination. The array may be controlled in a preprogrammed manner or may be controlled adaptively in response to a condition that is determined during acquisitions of sensor data. The array control means may be located externally of the underwater vehicles or in one of the underwater vehicles, or may be distributed among the underwater vehicles. The array control means may include means for controlling the shape of the array, the size of the array, the depth of one or more of the underwater vehicles in the array, the direction of movement of the array, the function of one or more of the underwater vehicles in the array and/or the velocity of the array.

The synchronizing subsystem and the navigation subsystem may utilize optical communication channels between selected ones of the underwater vehicles. In a first embodiment, the optical communication channels each include light-emitting diodes and photosensors for optical communication. In a second embodiment, the optical communication channels each include lasers and photosensors for optical communication. The synchronizing subsystem and the navigation subsystem may alternatively use high frequency acoustic communication channels between selected ones of the underwater vehicles. One or more of the underwater vehicles may include an acoustic excitation source.

According to another aspect of the invention, a method for oceanographic sampling is provided. Two or more underwater vehicles are disposed in an array. Each underwater vehicle includes a propulsion system for moving the underwater vehicle independently of other ones of the underwater vehicles. An ocean parameter is sensed with each of the underwater vehicles and sensor data representative of the ocean parameter is provided as the underwater vehicle moves. Position data representative of the position of each of the underwater vehicles is determined as the sensor data is acquired. The sensor data and the position data acquired by each of the underwater vehicles is time synchronized with sensor data and position data acquired by other ones of the underwater vehicles. The array of underwater vehicles is controlled as the time-synchronized sensor data and position data are acquired. The array of underwater vehicles thereby functions as a phased array.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
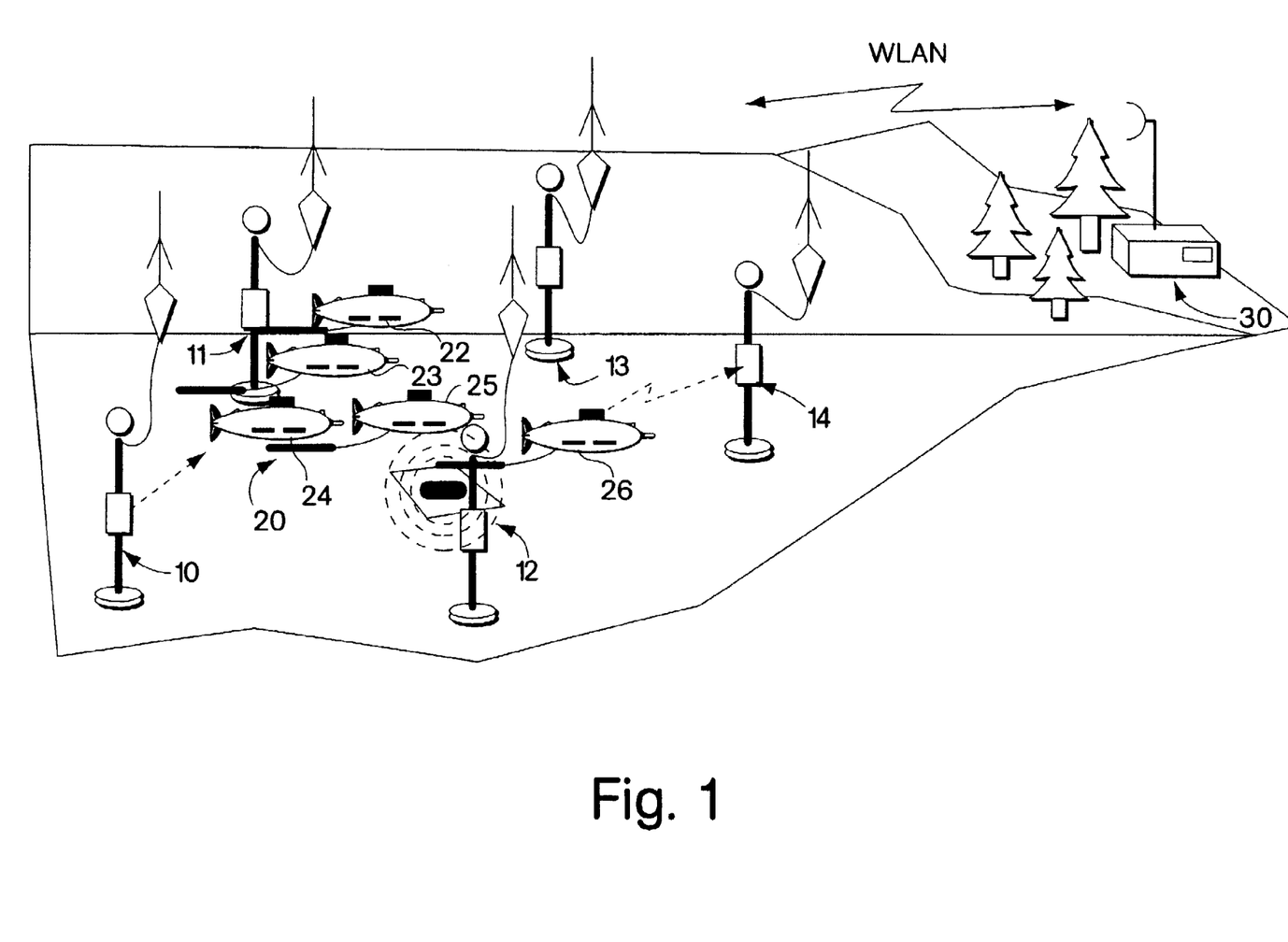
FIG. 1 is a pictorial diagram of an oceanographic sampling system in accordance with the invention, including an array of mobile autonomous underwater vehicles.

An example of an autonomous oceanographic sampling network incorporating an array of autonomous underwater vehicles (AUVs) in accordance with the invention is shown in FIG. 1. The system includes network nodes 10, 11, 12, 13 and 14, and an array 20 of autonomous underwater vehicles 22, 23, 24, 25 and 26. The array 20 of AUVs traverses the network and acquires data representing one or more parameters of interest. Each AUV includes one or more, sensors for sensing acoustic waves and/or electromagnetic waves. Each AUV typically includes one or more hydrophones for sensing acoustic energy. As described below, each AUV includes a navigation subsystem for accurately determining the position of each AUV, at least relative to the other AUVs in the array, during data acquisition. Each AUV further includes a time synchronization subsystem (which includes a time base) for accurately time synchronizing data acquired by the different AUVs. Phased array techniques can be used to process the time-synchronized sensor data and position data acquired by the array of AUVs. The wave energy arriving at the sensors on the AUVs is combined in phase to provide information regarding the source that is not available from a single sensor or a group of randomly phased sensors. The phased array techniques permit large aperture sensing and high resolution at a given acoustic or electromagnetic frequency.

Acquired data may be relayed from the AUVs to a network node, and more complete data sets are transferred when the vehicle is docked at a network node or when the vehicle is recovered. Each network node 10, 11, 12, 13 and 14 includes a base buoy, or mooring, containing an acoustic beacon, an acoustic modem for communicating with the AUVs, an energy source and one or more AUV docks. A central system 30, located on one of the network nodes, on a ship and/or on shore, processes the acquired data. As described below, the data processing may be performed in real time or near real time to adaptively control the array configuration. Alternatively, data processing may be performed at a later time.

Figure 2:
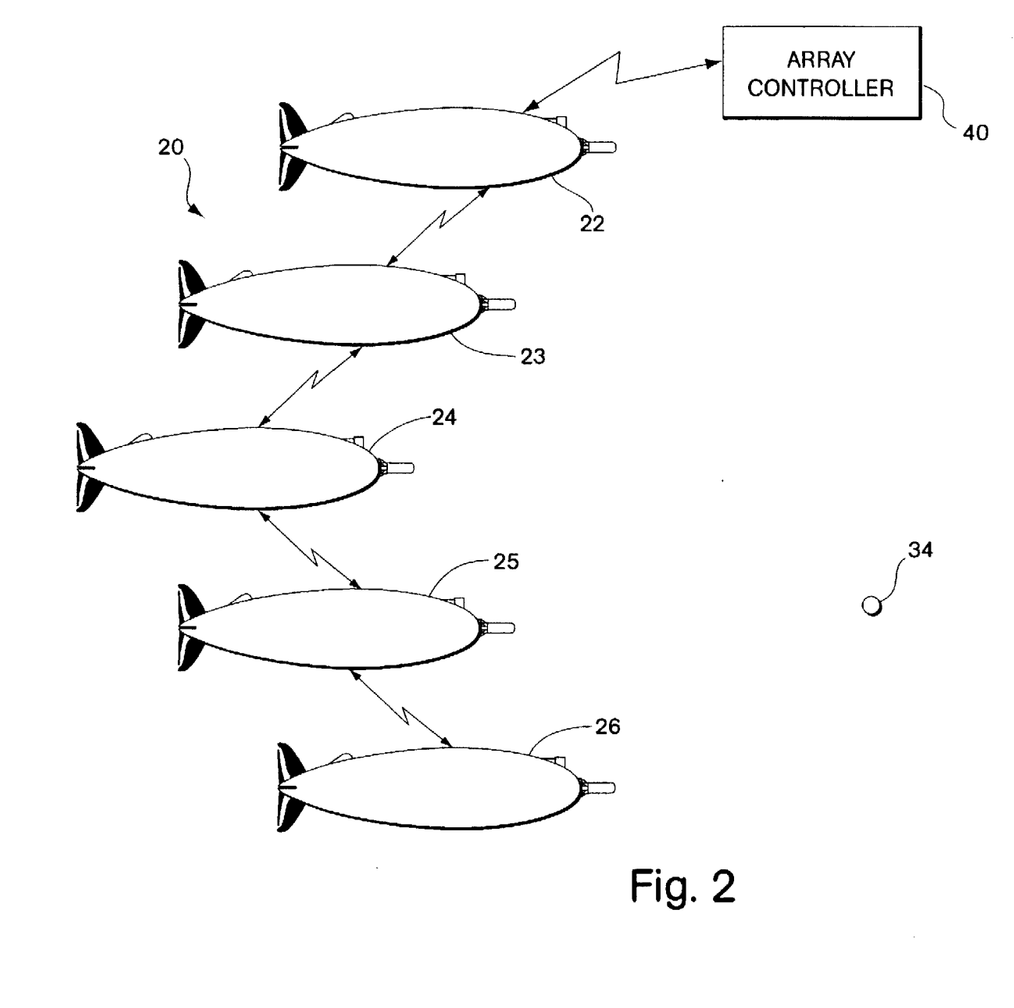
FIG. 2 is a schematic diagram of a mobile autonomous underwater array in accordance with the invention.

A schematic representation of the array 20 of AUVs is shown in FIG. 2. The array comprises a plurality of mobile autonomous underwater vehicles in an array configuration. Two or more AUVs may be utilized in the array. Each AUV includes at least one sensor, such as a hydrophone. The array may operate in an active mode or a passive mode. In the active mode, the array senses the response of the underwater environment to an excitation source. The excitation source may be located on one or more of the AUVs in the array or may be located externally of the array. For example, the excitation source may be located on a ship near the array. In the passive mode, the array senses emissions of the underwater environment without using an excitation source.

By way of example, the array 20 may be used to detect a target 34, such as a submarine or an animal. As known in the art, acoustic waves emanating from target 34 arrive at the sensors on AUVs 22, 23, 24, 25 and 26 at different times, depending on the positions of the AUVs relative to target 34. The time-synchronized sensor data and position data can be processed to determine the location of target 34.

In general, phased array techniques may be used in a wide variety of applications. The key elements required to operate the AUVs in an array are a navigation subsystem and a time synchronization subsystem. The navigation subsystem determines the position of each AUV as sensor data is acquired. The navigation subsystem may acquire absolute position data, but at a minimum is required to determine the position of the AUV relative to other AUVs in the array. Because the array configuration and position change with time, position data must be synchronized with sensor data for each AUV in the array. Each sensor data sample has a corresponding position data sample that indicates the position of the AUV when the sensor data sample was acquired. In addition, the sensor data samples acquired by the AUVs must be time-synchronized to permit phased array processing. Since the AUVs operate independently, some be communication between AUVs may be required to effect time synchronization. As described below, a variety of time synchronization techniques may be utilized. In the complete data set, each sensor data sample is associated with an indication of the time of the data sample and an indication of the position of the AUV when the sensor data sample was acquired.

The oceanographic sampling system incorporating array 20 of AUVs typically includes an array controller 40 for controlling one or more parameters of the array. The array parameters include, but are not limited to, array configuration (size and shape of the array), array movement (direction, velocity and depth of the array) and , AUV function (AUV motor on or off, transmit sensor data to remote location, etc.). Some or all of the array parameters may be fixed or may vary with time. Some or all of the array parameters may be controlled in a preprogrammed manner or may be controlled adaptively, in response to a condition that is determined during acquisition of sensor data. Adaptive control is frequently based on sensor data. However, adaptive control may be based on one or more other parameters (which may be measured by auxiliary sensors), such as water temperature or ocean depth, or on externally sensed parameters transferred to the array controller.

The array controller 40 may have a variety of different configurations. Where array parameters are preprogrammed, the array control function may be incorporated into the array itself. One of the AUVs may function as a master, or the array control may be distributed among the AUVs. In cases where one or more array parameters are controlled adaptively, the array controller may be located externally of the array 20. In particular, the array controller 40 may be located in one of the network nodes, on a ship or in a shore station. The array controller may be associated with a system which processes the acquired sensor data and determines changes to one or more of the array parameters based on the sensor data. As indicated above, the size, shape, depth, direction and/or velocity of the array and the function of one or more AUVs in the array may be controlled adaptively in response to the acquired sensor data or other condition of interest in real time or near real time. Alternatively, a master AUV may process the acquired sensor data or other condition data and perform the array control function. Where the array is controlled adaptively, the acquired sensor data or other condition data is transmitted from each AUV to the array controller for sufficient processing to make decisions as to changes in array parameters.

The navigation and synchronization functions typically require communication between AUVs. As described below, a variety of communication techniques may be utilized. Typically, each AUV in array 20 communicates with its nearest neighbors. A relatively high bandwidth communication channel is preferable. This permits time synchronization information, navigation information and sensor data to be passed between AUVs. However, low bandwidth communication channels may be utilized within the scope of the present invention. For example, where each AUV has a highly accurate clock for synchronization and data is not transferred between AUVs, a lower bandwidth communication channel may be sufficient.

Figure 3:
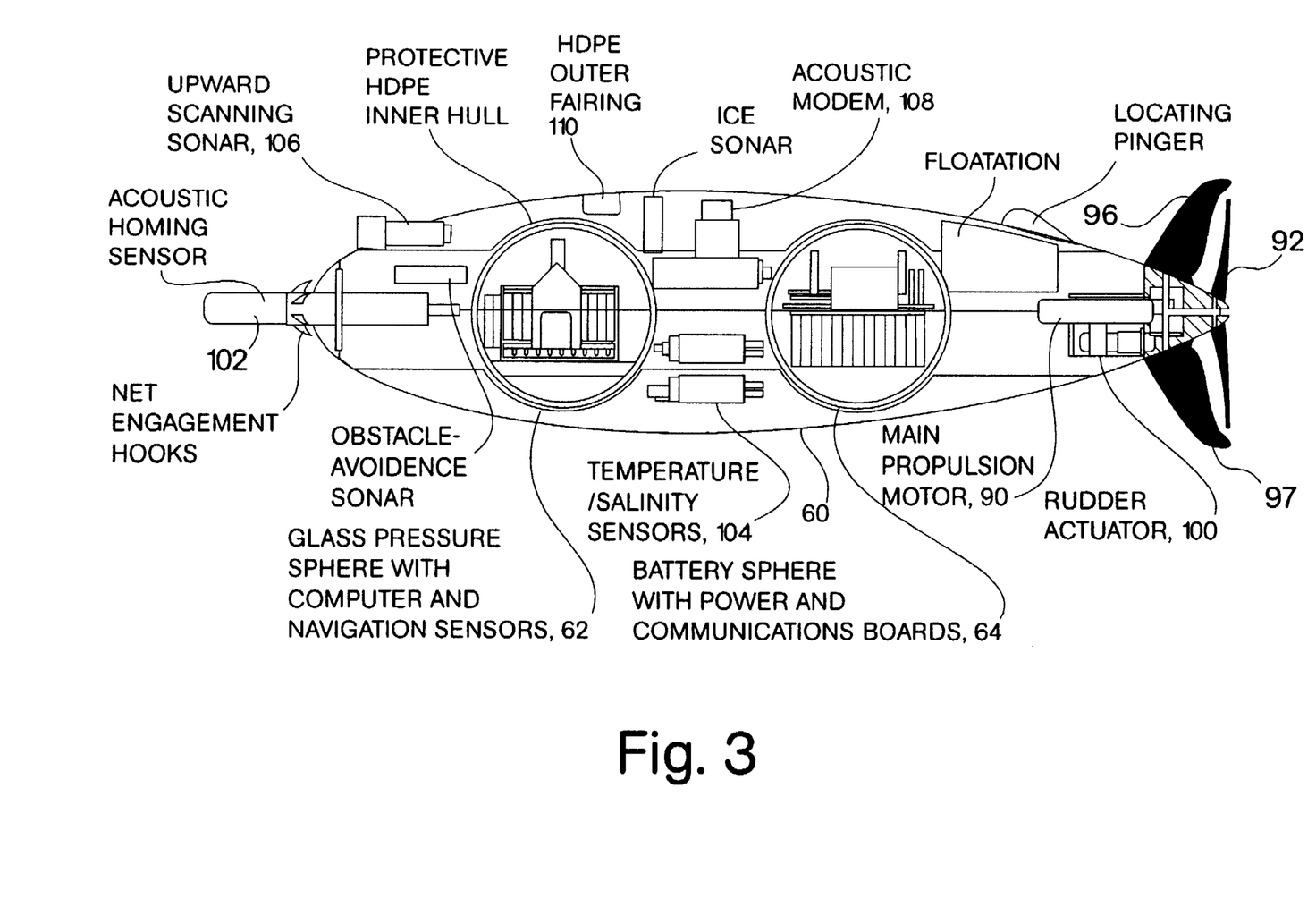
FIG. 3 is a schematic cross-sectional diagram of an example of an autonomous underwater vehicle suitable for use in the oceanographic sampling system of the present invention.

An example of a small, high-performance propeller-driven autonomous underwater vehicle suitable for use in an array configuration is shown in FIG. 3. The vehicle is 2.1 meters long, has a maximum diameter of 0.6 meter and is rated to a depth of 6700 meters. A flooded plastic shell 60 provides a low-drag hull. Inside the hull are one or more standard glass instrumentation spheres used for ocean work. The underwater vehicle of FIG. 3 includes an electronics sphere 62 and a battery sphere 64. A propulsion system includes a motor 90, a propeller 92, rudders 96 and 97, and a rudder actuator 100. The underwater vehicle may further include an acoustic homing sensor 102, temperature/salinity sensors 104, an upward scanning sonar 106, an acoustic modem 108 and may include other sensors. The AUV typically includes a sensor such as a hydrophone 110. The electronics sphere 62 includes a computer, a memory for storing acquired data and circuitry for controlling motor 90 and rudders 96 and 97. The battery sphere 64 includes batteries for powering a components of the AUV. The vehicle is autonomous in the sense that it may move to any X-Y coordinates and depth within the ocean volume being monitored. Underwater vehicles of this type are described in more detail by J. Bellingham, et al. in "A Small Long-Range Autonomous Vehicle for Deep Ocean Exploration", *Proceedings of the Second* (1992) *International Offshore and Polar Engineering Conference*, San Francisco, Calif., June 14–19, 1992 and by J. Bellingham, et al. in "A Second Generation Survey AUV", *Conference Proceedings AUV '94. IEEE*, Jul. 19–20, 1994, Cambridge, Mass.

It will be understood that different underwater vehicle configurations may be utilized in the mobile underwater arrays of the present invention. Thus, while the array of FIGS. 1 and 2 utilizes autonomous underwater vehicles, underwater arrays in accordance with the invention may utilize manned, tethered and/or autonomous underwater vehicles, or combinations of such vehicles.

Figure 4:
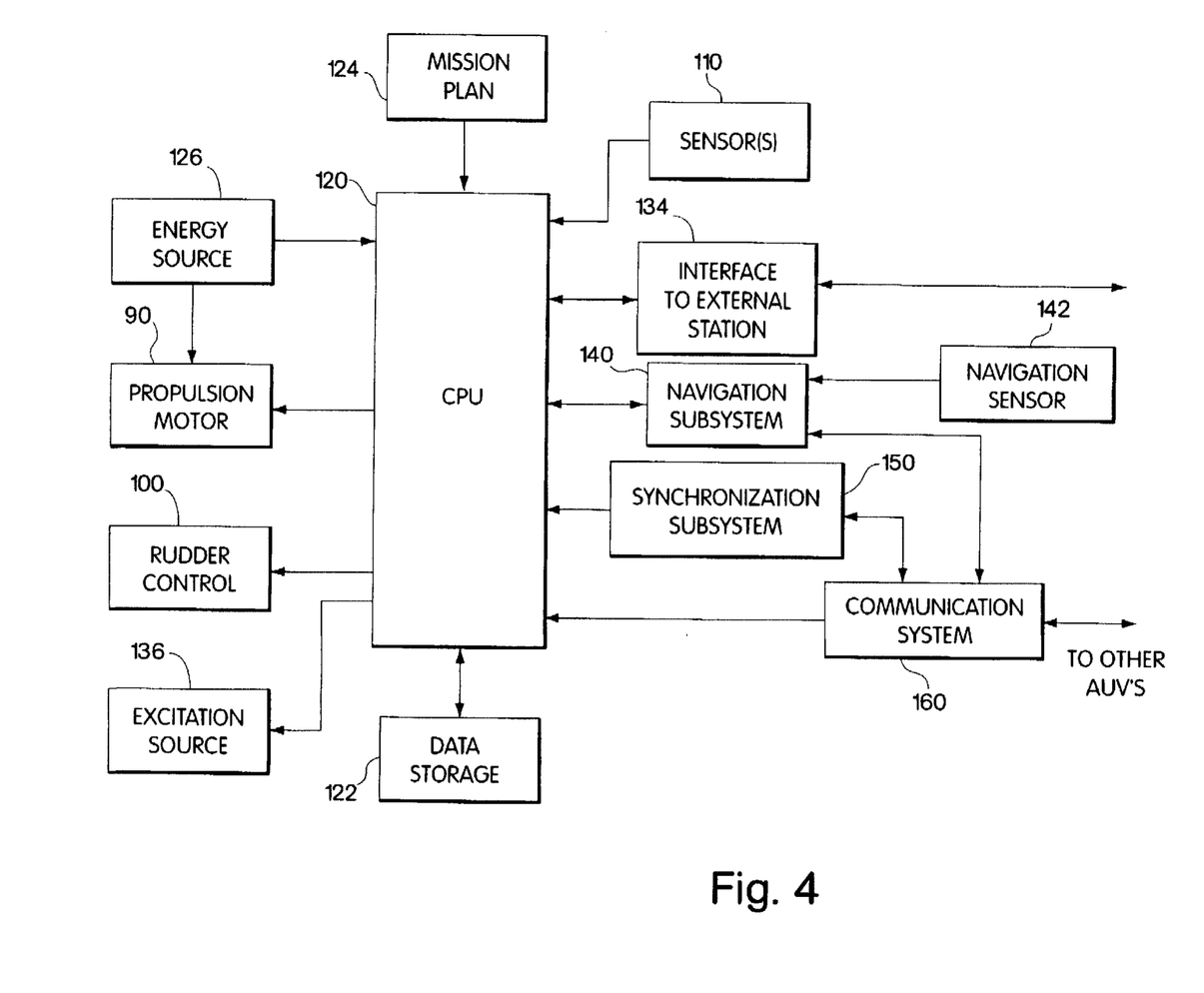
FIG. 4 is a block diagram of the autonomous underwater vehicle of FIG. 2.

A block diagram of an autonomous underwater vehicle corresponding to the AUV of FIG. 3 is shown in FIG. 4. A CPU 120 controls operation of the AUV. The CPU 120 may, for example, be a 40 MHz type 68030 microprocessor. A data storage unit 122, such as a hard disk, stores control programs, acquired data and any other program and data information associated with operation of the AUV. A mission plan 124 defines the operation of the AUV in a particular application. The mission plan 124 is typically implemented as a control program stored in data storage unit 122. An energy source 126 provides operating power for propulsion motor 90, CPU 120 and all other AUV components that require energy for operation. One or more sensors 110 sense a parameter or parameters in accordance with the mission plan 124. The sensor for a phased array of AUVs is typically a hydrophone for sensing acoustic waves. However, the array may be utilized for sensing electromagnetic wave energy propagating in the ocean. In this case, each AUV includes an antenna. The sensor 110 may be mounted on the hull of the AUV or may be towed behind the AUV. A single sensor or an array of sensors may be utilized. Two or more sensors may be mounted on different parts of the hull to avoid shadowing.

The AUV further includes an interface 134 for transmitting data to and receiving data from an external station, such as one of the network nodes described above. The interface 134 may include an acoustic modem for transmitting data to the network node through water and may include an interface circuit for direct data transfer to the network node when the AUV is docked. The interface 134 may also be utilized for transfer of control information from the array controller 40 (FIG. 2). The control information may be used to control the size, shape, direction, depth and/or velocity of the array of AUVs. Other data transfer techniques may be utilized within the scope of the invention. For example, the sensor data may be stored within the AUV on magnetic tape, floppy disk, hard disk or any other storage medium for subsequent removal from the AUV after completion of the mission.

As discussed above, the AUV includes a navigation subsystem 140, which may operate in conjunction with a navigation sensor 142. The navigation system may utilize known long baseline navigation techniques. The primary navigation sensor may be an acoustic transducer. A suitable acoustic navigation sensor is the Model PS8000 Acoustic Transceiver, sold by Edgetech, Inc. Of Milford, Mass. The primary navigation sensor may be supplemented by one or more additional sensors such as a compass, a water speed sensor, an acceleration sensor and/or a pitch and roll sensor. The navigation subsystem 140 determines the position of the AUV as data is acquired by sensor 110 during a mission The position may be an absolute position relative to geographic coordinates or may be relative to one or more of the AUVs in the array. Any suitable underwater navigation technique may be utilized. For example, the AUV may determine its position relative to one or more acoustic transponders deployed in the area. Underwater navigation is described, for example, by H. Singh, et al. in "An Integrated Approach to Multiple AUV Communications, Navigation and Docking", *Oceans '96 MTS/IEEE Conference Proceedings*. In other approaches, navigation may be performed by an inertial guidance system or through the use of vehicle-relative navigation techniques. Other navigation techniques are described by J. L. Backes et al in "Long-Baseline Deep Ocean Acoustic Tracking and Telemetry System," *Proceedings of Oceans '81*, Boston, Mass., p. 1, 1981; M. Deffenbaugh et al in "The Relationship between Spherical and Hyperbolic Positioning," *Proceedings of Oceans '96*, Ft. Lauderdale, Fla., p. 590, 1996; and D. R. Yoerger et al in "Precise Navigation and Control of an ROV at 2200 Meters Depth," *Proceedings of ROV '92*, San Diego, Calif., 1992. An example of vehicle-relative navigation and control is described by M. Triantafyllou, et al. "Distributed Control of Multiple AUV Forming Effective Chains", *Proceedings of the 7th International Symposium on Unmanned, Untethered Submersible Technology*, University of New Hampshire, September 23–25, 1991, pages 499–518.

in addition to position sensing, the navigation subsystem 140 may be used to control the position of the AUV in the array. For example, the CPU 120 may compare the position data provided by the navigation subsystem 140 with a desired position and issue corrections to the propulsion motor 90 and/or rudder control 100.

The AUV further includes a synchronization subsystem 150 for time synchronization of the acquired sensor data and the corresponding position data. The synchronization subsystem 150 typically includes a high accuracy clock which may, for example, be used to time stamp each sensor data sample and corresponding position data sample. The synchronizing subsystem 150 also includes circuitry for synchronizing with other AUVs in the array. Where the AUVs have clocks of moderate accuracy, synchronizing signals may be transmitted between AUVs at intervals. Where the AUVs have very high accuracy clocks, less frequent synchronization between AUVs is required. Techniques for time synchronization are well known to those skilled in the art and are used, for example, in network data communication.

The AUV may include a communication system 160 for communication with other AUVs in the array. The communication system is coupled to CPU 120, navigation subsystem 140 and synchronization subsystem 150. As described above, synchronizing signals may be transmitted by the synchronization subsystem 150 via communication system 160 to other AUVs in the array. The synchronizing signals may comprise a pulse or a series of pulses that is transmitted at intervals to resynchronize each clock in the array. The intervals between resynchronization depend on the accuracy and stability of the clock in each AUV. Navigation information may be transferred by the navigation subsystem 140 to and from other AUVs in the array via communication system 160. Transfer of navigation information is required where vehicle-relative navigation is utilized. Navigation information may be transferred in other implementations to ensure that the AUVs in the array are following desired courses.

The communication system 160 is also utilized in cases where the array is adaptively controlled. The control information may be used to control the size, shape, depth, direction and/or velocity of the array. In one embodiment, one of the AUVs acts as a master to control the other AUVs. The master AUV may determine the control information locally or may receive the control information from a remote site, such as a network node, a ship or a shore station. The control information may be provided manually from the control station or may be provided automatically in response to analysis of the sensor data. As a simple example of adaptive control, the array of AUVs may turn toward an acoustic source of interest. In addition, the function of the AUV may be controlled adaptively. For example, when the noise of the AUV motors interferes with sensor data acquisition, the AUV motors can be turned off, allowing the AUVs to drift.

The communication system 160 may be implemented in a variety of ways. In one approach, optical communication is utilized. A technique for high bandwidth underwater communication utilizing modulated, light-emitting diodes is described by J. W. Bales, et al. in "High Bandwidth, Low-Power, Short-Range Optical Communication Underwater", *Proceedings of the 9th International Symposium on Unmanned, Untethered Submersible Technology*, Durham, N.H., September 25–27, 1995, pages 406–415. In another approach, lasers are used for communication between AUVs. Lasers provide increased range and bandwidth, but require pointing of the laser at the receiving AUV. In yet another approach, a high frequency acoustic system is used for communication between AUVs. The communications system is typically required to have a bandwidth of about 1 MHz and a range on the order of 10–20 meters.

Figure 5:
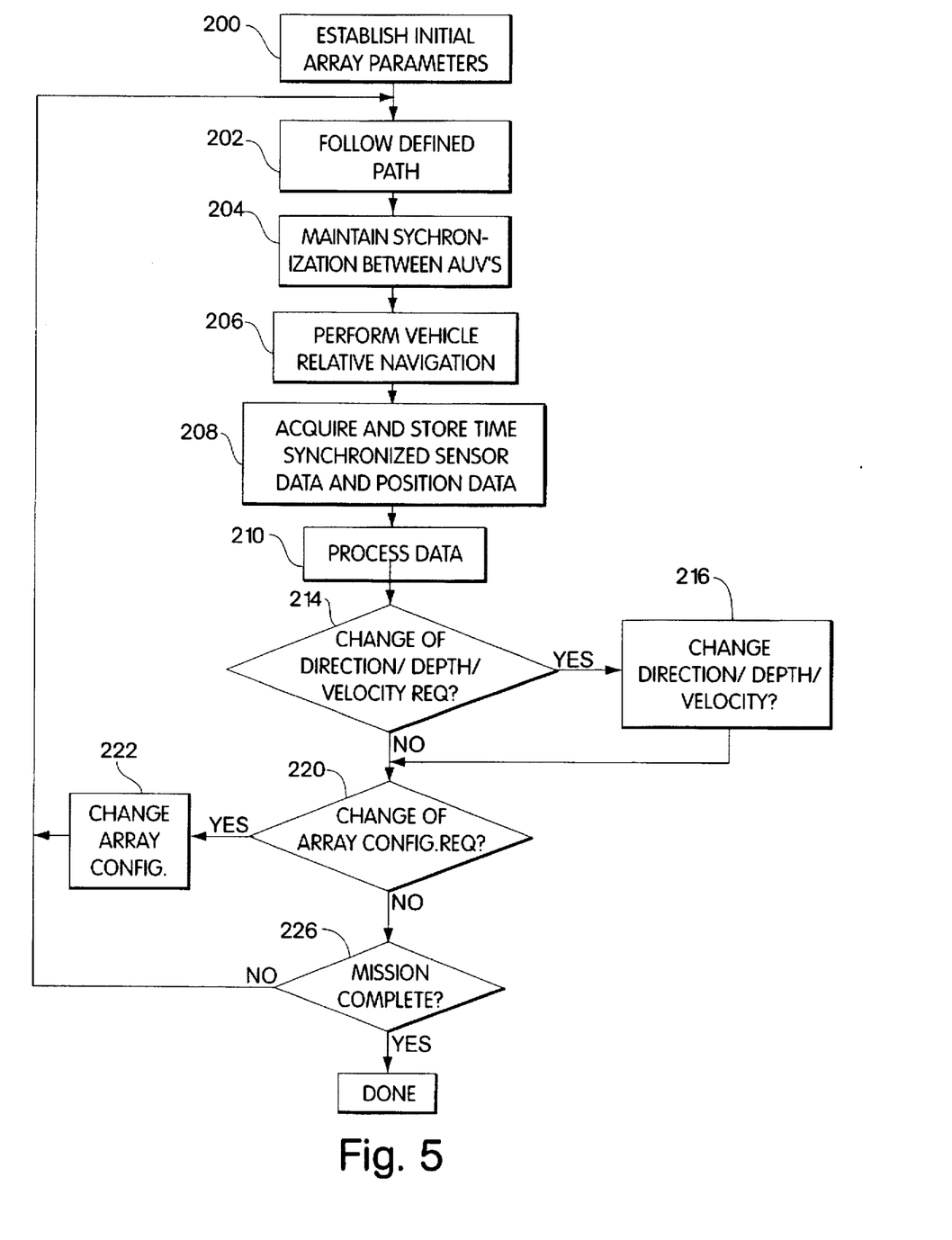
FIG. 5 is a flow chart which illustrates the operation of the oceanographic sampling system of the present invention.

A flow diagram of the operation of the oceanographic sampling system of the present invention is shown in FIG. 5. In step 200, initial array parameters are established, for example by the mission plan 124. The initial array parameters define the spacing between AUVs in the array, the shape of the array, the depth of the array, the velocity and direction of the array, the initial positions of the AUVs in the survey area, a path to be followed by the array, and any other parameters needed to initialize array operation. In step 202, the AUVs in the array follow the path that is defined, at least initially, by the initial array parameters. The AUVs in the array maintain synchronization in step 204 and perform vehicle relative navigation in step 206. Time-synchronized sensor data and position data are acquired and are stored in the data storage unit 122 in step 208. The acquired data may be processed by the AUV in step 210. Processing of data by the AUV is optional, depending on the mission requirements and the capabilities of the AUV. In one embodiment, the acquired data may be processed to determine any changes to the array configuration or array movement. In other embodiments, the acquired data may be processed either partially or fully by the AUV. In yet another embodiment, the raw acquired data is transferred to a remote site for processing.

In step 214, a determination is made whether a change of direction, depth and/or speed is required. The determination may, for example, be based on the results of data processing. For example, the speed may be reduced when the acquired data indicates a region of interest, or the direction of travel may be changed toward an acoustic source of interest. The direction, depth and/or speed are changed in step 216, and the process returns to step 202 to continue data acquisition. In step 220, a determination is made whether a change of array configuration is required. The determination may be based on the results of the data processing in step 210. If necessary, the array configuration is changed in step 222 and the process returns to step 202 to continue data acquisition. Steps 220 and 222 may also be used to change the function of one or more AUVs in the array, if necessary. The determination of a change of direction, depth and/or speed in step 214 and the determination of a change in array configuration in step 220 may be based on the acquired data, preprogrammed changes that are a part of the mission plan, control information that is received from a remote array controller, or on a combination of these sources.

In step 226, a determination is made whether the mission is complete by comparison of the current array status with the mission plan. When the mission is not complete, the process returns to step 202 to continue acquisition of time-synchronized sensor data and position data. After completion of the mission, the master AUV of the array may, for example, notify a remote station that the mission has been completed.

As indicated above, a variety of mission profiles may be utilized with the mobile underwater arrays of the present invention. The mission profile is defined by a number of parameters, including the shape of the AUV array (straight line, curved, V-shaped, etc.), the size of the array (the number of AUVs and the spacing between AUVs), the orientation of the array (vertical, horizontal, etc.) the depth of the array in the ocean volume of interest, the direction of movement of the AUV array, the speed of the AUV array, and any other parameters that are required to define a particular mission. Some or all of these parameters may be fixed during a mission or may be variable in a preprogrammed manner. Furthermore, some or all of the parameters may be adaptively controlled during the mission, either manually or automatically, in response to analysis of the acquired data.

Processing may be performed in a master AUV or may be distributed among the AUVs. Furthermore, processing may be performed remotely, such as in a network node, on a ship or in a shore station. Real-time or near real-time processing is required for adaptive control of the array parameters. More detailed data processing, not required for control of the array, may be performed at any time. The acquired data may be transferred either in raw form or in preprocessed form to a remote site for analysis. Relevant processing techniques are well known and are discussed in *Matched Field Processing for Underwater Acoustics*, by A. Tolstoy, published by World Scientific, Singapore, 1993 and *Computational Ocean Acoustics*, by Finn B. Jensen, et al, published by the American Institute of Physics, NY, N.Y. 1994.

One or more of the AUVs may include an excitation source 136. The excitation source 136 may be an acoustic source or an electromagnetic source and may, for example, transmit pulsed energy. Excitation sources in each of the AUVs may be energized coherently to transmit a focused beam. Alternatively, the sources may be energized sequentially to obtain different views of a structure of interest. In another configuration of the oceanographic sampling system, one or more excitation sources may be located externally of the array, such as for example on a ship.

The mobile array of underwater vehicles in accordance with the invention has a wide variety of potential applications including, but not limited to, the following. Offshore oil exploration and recovery applications include bathmetric mapping for determining optimum routes for pipelines, initial seismic surveys for resources, detailed seismic surveys near existing oil platforms to optimize production, and pipeline inspection. Military applications include mine countermeasures, covert surveillance, harbor defense, target localization and reconnaissance. Environmental, oceanographic and biological science applications include tracking marine mammals, characterizing plumes from wastewater outfalls, bathymetric mapping, acoustic tomography of oceanographic structures and mapping of oceanographic structures.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An oceanographic sampling system comprising:

a plurality of underwater vehicles disposed in an array having an array configuration, each underwater vehicle including a propulsion system for moving said underwater vehicle independently of other ones of said underwater vehicles, a sensor for sensing an ocean parameter and providing sensor data representative of the ocean parameter, a navigation subsystem for determining relative position data representative of the position of said underwater vehicle relative to other ones of said underwater vehicles as said sensor data is acquired and a synchronizing subsystem for time synchronizing the sensor data and the relative position data acquired by said underwater vehicle with sensor data and relative position data acquired by other ones of said underwater vehicles; and array control means for controlling said array of said underwater vehicles as said time-synchronized sensor data and relative position data are acquired, wherein said control means comprises means for controlling operation of said array of underwater vehicles as a unit such that said underwater vehicles acquire array data sets containing information that is not present in the sensor data from individual ones of said underwater vehicles.

2. An oceanographic sampling system as defined in claim 1, wherein said array control means includes means for controlling said array configuration.

3. An oceanographic sampling system as defined in claim 1, wherein said array control means includes means for controlling movement of said array.

4. An oceanographic sampling system as defined in claim 1, wherein said array control means includes means for controlling a function of one or more of said plurality of underwater vehicles.

5. An oceanographic sampling system as defined in claim 1, wherein said array control means includes means for controlling said array in a preprogrammed manner.

6. An oceanographic sampling system as defined in claim 1, wherein said array control means includes means for adaptively controlling said array in response to a condition determined during acquisition of said sensor data.

7. An oceanographic sampling system as defined in claim 1, wherein said array control means includes means for adaptively controlling said array in response to said sensor data.

8. An oceanographic sampling system as defined in claim 1, wherein said array control means is located externally of said plurality of underwater vehicles.

9. An oceanographic sampling system as defined in claim 1, wherein said array control means is located in one of said underwater vehicles.

10. An oceanographic sampling system as defined in claim 1, wherein said array control means is distributed among said plurality of underwater vehicles.

11. An oceanographic sampling system as defined in claim 1, wherein said array control means includes means for controlling the shape of said array as said sensor data is acquired.

12. An oceanographic sampling system as defined in claim 1, wherein said array control means includes means for controlling the size of said array as said sensor data is acquired.

13. An oceanographic sampling system as defined in claim 1, wherein said array control means includes means for controlling the depth of one or more of said underwater vehicles as said sensor data is acquired.

14. An oceanographic sampling system as defined in claim 1, wherein said array control means includes means for controlling a direction of movement of said array as said sensor data is acquired.

15. An oceanographic sampling system as defined in claim 1, wherein said array control means includes means for controlling a velocity of movement of said array as said sensor data is acquired.

16. An oceanographic sampling system as defined in claim 1, wherein one or more of said underwater vehicles includes means for preprocessing said sensor data.

17. An oceanographic sampling system as defined in claim 1, wherein said underwater vehicles include means for distributed processing of said position data and said time-synchronized sensor data.

18. An oceanographic sampling system as defined in claim 1, wherein each of said underwater vehicles further includes a communication subsystem for transmitting and receiving position control information, navigation information and synchronization information.

19. An oceanographic sampling system as defined in claim 1, wherein said synchronizing subsystem and said navigation subsystem utilize optical communication channels between selected ones of said underwater vehicles.

20. An oceanographic sampling system as defined in claim 19, wherein said optical communication channels each include light-emitting diodes and photosensors for optical communication.

21. An oceanographic sampling system as defined in claim 19, wherein said optical communication channels each include lasers and photosensors for optical communication.

22. An oceanographic sampling system as defined in claim 1, wherein said synchronizing subsystem and said navigation subsystem utilize high frequency acoustic communication channels between selected ones of said underwater vehicles.

23. An oceanographic sampling system as defined in claim 1, wherein said synchronizing system includes an ultra stable clock for time stamping said sensor data.

24. An oceanographic sampling system as defined in claim 1, wherein each of said underwater vehicles further includes means for transferring said time-synchronized sensor data and position data to an external data storage device.

25. An oceanographic sampling system as defined in claim 1, wherein at least one of said underwater vehicles includes an acoustic excitation source.

26. An oceanographic sampling system as defined in claim 1, wherein at least one or said underwater vehicles includes an electromagnetic excitation source.

27. An oceanographic sampling system as defined in claim 1, wherein said array functions in a passive mode.

28. An oceanographic sampling system as defined in claim 1 further including an excitation source for generating an excitation signal, wherein said array functions in an active mode for sensing responses to said excitation signal.

29. An oceanographic sampling system as defined in claim 28, wherein said excitation source is located in one or more of said underwater vehicles.

30. An oceanographic sampling system as defined in claim 28, wherein said excitation source is located external to said array of underwater vehicles.

31. A method for oceanographic sampling comprising the steps of:

providing a plurality of underwater vehicles disposed in an array having an array configuration, each underwater vehicle including a propulsion system for moving said underwater vehicle independently of other ones of said underwater vehicles;

sensing an ocean parameter with each of said underwater vehicles and providing sensor data representative of the ocean parameter determining relative position data representative of the position of each of said underwater vehicles relative to other ones of said underwater vehicles as said sensor data is acquired;

time-synchronizing the sensor data and the relative position data acquired by each of said underwater vehicles with sensor data and relative position data acquired by other ones of said underwater vehicles; and controlling said array of said underwater vehicles as said time-synchronized sensor data and relative position data are acquired, comprising controlling operation of said array as a unit such that said underwater vehicles acquire array data sets containing information that is not present in the sensor data from individual ones of said underwater vehicles.

32. A method as defined in claim 31 wherein the step of controlling said array includes controlling said array in a preprogrammed manner.

33. A method as defined in claim 31 wherein the step of controlling said array includes providing control information to said each of said underwater vehicles as said time-synchronized sensor data and position data are acquired.

34. A method as defined in claim 31 wherein the step of controlling said array includes adaptively controlling said array in response to a condition determined during acquisition of said sensor data.

35. A method as defined in claim 31 wherein the step of controlling said array includes controlling the shape of said array as said sensor data is acquired.

36. A method as defined in claim 31 wherein the step of controlling said array includes controlling the size of said array as said sensor data is acquired.

37. A method as defined in claim 31 wherein the step of controlling said array includes controlling the depth of one or more of said underwater vehicles as said sensor data is acquired.

38. A method as defined in claim 31 wherein the step of controlling said array includes controlling a direction of movement of said array as said sensor data is acquired.

39. A method as defined in claim 31 wherein the step of controlling said array includes controlling a velocity of movement of said array as said sensor data is acquired.

40. A method as defined in claim 31 wherein the step of controlling said array includes controlling a function of one or more of said underwater vehicles as said sensor data is acquired.

41. A method as defined in claim 31 wherein the step of sensing includes passively sensing said ocean parameter.

42. A method as defined in claim 31 further including the step of transmitting excitation signals in an underwater region of said array of underwater vehicles, wherein the step of sensing includes sensing responses to said excitation signals.

43. A method as defined in claim 42 wherein the step of transmitting includes transmitting said excitation signals from one or more of said underwater vehicles.

44. A method as defined in claim 42 wherein the step of transmitting includes transmitting said excitation signals externally of said underwater vehicles.

45. A method as defined in claim 42 wherein the step of transmitting includes transmitting acoustic excitation signals.

46. A method as defined in claim 42 wherein the step of transmitting includes transmitting electromagnetic excitation signals.

* * * * *